(12) United States Patent
Masuda et al.

(10) Patent No.: US 9,634,605 B2
(45) Date of Patent: Apr. 25, 2017

(54) MOTOR DRIVE CONTROLLER

(71) Applicant: MINEBEA CO., LTD., Kitasaku-Gun, Nagano (JP)

(72) Inventors: Shigemi Masuda, Fukuroi (JP); Toshikazu Koshiba, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/075,328

(22) Filed: Mar. 21, 2016

(65) Prior Publication Data

US 2016/0285403 A1 Sep. 29, 2016

(30) Foreign Application Priority Data

Mar. 26, 2015 (JP) ................................. 2015-063806

(51) Int. Cl.
*H02H 7/09* (2006.01)
*H02P 29/024* (2016.01)
*H02P 29/032* (2016.01)

(52) U.S. Cl.
CPC .......... *H02P 29/027* (2013.01); *H02P 29/032* (2016.02)

(58) Field of Classification Search
CPC ........ H02P 29/02; H02P 29/027; H02P 6/002; H02P 6/14
USPC ......... 318/400.22, 432, 434; 361/5–7, 9, 10, 361/16, 17, 18, 20, 21, 33, 56, 57, 65, 361/91.1, 93.1, 91.2, 93.9, 93.7, 85; 702/57, 58, 64
See application file for complete search history.

(56) References Cited

U.S. PATENT DOCUMENTS

| | | | | |
|---|---|---|---|---|
| 6,239,998 B1* | 5/2001 | Majumdar | ........... | H02M 7/5387 363/132 |
| 6,483,270 B1* | 11/2002 | Miyazaki | ............. | G05B 19/231 318/609 |
| 6,949,906 B2* | 9/2005 | Boscolo | .................... | H02P 6/24 318/530 |
| 7,084,601 B2* | 8/2006 | Maeda | ................... | G01R 1/203 318/803 |
| 7,626,350 B2* | 12/2009 | Mori | ......................... | H02P 6/10 318/432 |
| 7,847,498 B2* | 12/2010 | Shibuya | .................. | H02P 6/185 318/400.01 |
| 7,859,205 B2* | 12/2010 | Mori | ......................... | H02P 3/22 318/379 |
| 9,093,931 B2* | 7/2015 | Shibuya | .................. | H02P 6/002 |

(Continued)

FOREIGN PATENT DOCUMENTS

JP 2009-281538 A 12/2009

*Primary Examiner* — Rita Leykin
(74) *Attorney, Agent, or Firm* — Carrier Blackman & Associates, P.C.; Joseph P. Carrier; William D. Blackman

(57) ABSTRACT

A motor drive controller includes: a phase current detection circuit including: an RC network circuit in which a resistor and a capacitor are connected in series, the RC network circuit being configured to be connected in parallel with one or more coils of each phase of a motor; and a filter circuit that smooths a signal based on a voltage signal across the capacitor, wherein the phase current detection circuit generates a DC voltage signal that corresponds to a change in a value of a phase current flowing in the coils; a motor driver that drives the motor by applying a voltage to each phase of the motor; and a controller that receives the DC voltage signal from the phase current detection circuit and controls the motor driver based on the DC voltage signal.

7 Claims, 6 Drawing Sheets

(56) References Cited

U.S. PATENT DOCUMENTS

| | | | |
|---|---|---|---|
| 2002/0195981 A1* | 12/2002 | Sakai | H02P 6/085 318/400.01 |
| 2006/0028161 A1* | 2/2006 | Yamamoto | H02P 6/10 318/432 |
| 2006/0055352 A1* | 3/2006 | Mori | H02P 6/10 318/432 |
| 2006/0097674 A1* | 5/2006 | Nishihara | H02P 6/182 318/400.05 |
| 2006/0197480 A1* | 9/2006 | Mori | H02P 6/15 318/400.04 |
| 2008/0048598 A1* | 2/2008 | Shibuya | H02P 6/185 318/400.1 |
| 2009/0289593 A1 | 11/2009 | Okabe et al. | |

* cited by examiner

MOTOR DRIVE CONTROLLER

BACKGROUND OF THE INVENTION

1. Field of the Invention

The present invention relates to a motor drive controller including a phase current detection circuit for detection phase current of a motor.

2. Description of the Related Art

As a method for detecting a current flowing in a motor, there is known a method that detects the current using a shunt resistor. For example, in JP-A-2009-281538, it is described in an object to solve section in the abstract that "to provide a control device of an automatic transmission for securing safety and a feeling of a vehicle by precisely controlling clutch engaging force, by improving current feedback control accuracy in a motor without dulling a motor current value change." In paragraph [0038] of JP-A-2009-281538, it is described that "a current detection resistor (hereinafter, referred to as "shunt resistor") 207 is inserted into a bus 206 connecting a battery 202 and an inverter 203, and a potential difference is generated across the shunt resistor 207 when a current flows by rotation of a brushless motor 204. This potential difference is filtered by a filter circuit 208 and is transmitted as a voltage signal to a current detection unit 209. The current detection unit 209 calculates a current value based on data which is obtained by A/D-converting the transmitted voltage signal at each edge of a Hall sensor signal."

In the detection method using a shunt resistor, steady loss of power in this shunt resistor may become very large depending on a design specification and it may be difficult to implement the method in a realistic design. Accordingly, a method of decreasing a detection value in the shunt resistor to reduce the loss and level-shifting and amplifying the detection signal is considered.

However, in the method of level-shifting or/and amplifying the detection signal, there is a possibility that the current detection circuit may be rather complicated as a whole. Further, in case of overload, a shunt resistor having a large rated value has to be inevitably used.

SUMMARY OF THE INVENTION

One of objects of the present invention is to provide a motor drive controller that can detect a current with very low power consumption with a simple circuit configuration.

According to an illustrative embodiment of the present invention, there is provided a motor drive controller including: a phase current detection circuit including: an RC network circuit in which a resistor and a capacitor are connected in series, the RC network circuit being configured to be connected in parallel with one or more coils of each phase of a motor; and a filter circuit that smooths a signal based on a voltage signal across the capacitor, wherein the phase current detection circuit generates a DC voltage signal that corresponds to a change in a value of a phase current flowing in the coils; a motor driver that drives the motor by applying a voltage to each phase of the motor; and a controller that receives the DC voltage signal from the phase current detection circuit and controls the motor driver based on the DC voltage signal.

DETAILED DESCRIPTION

Hereinafter, embodiments of the present invention will be described in detail with reference to the accompanying drawings and equations.

Figure 1:
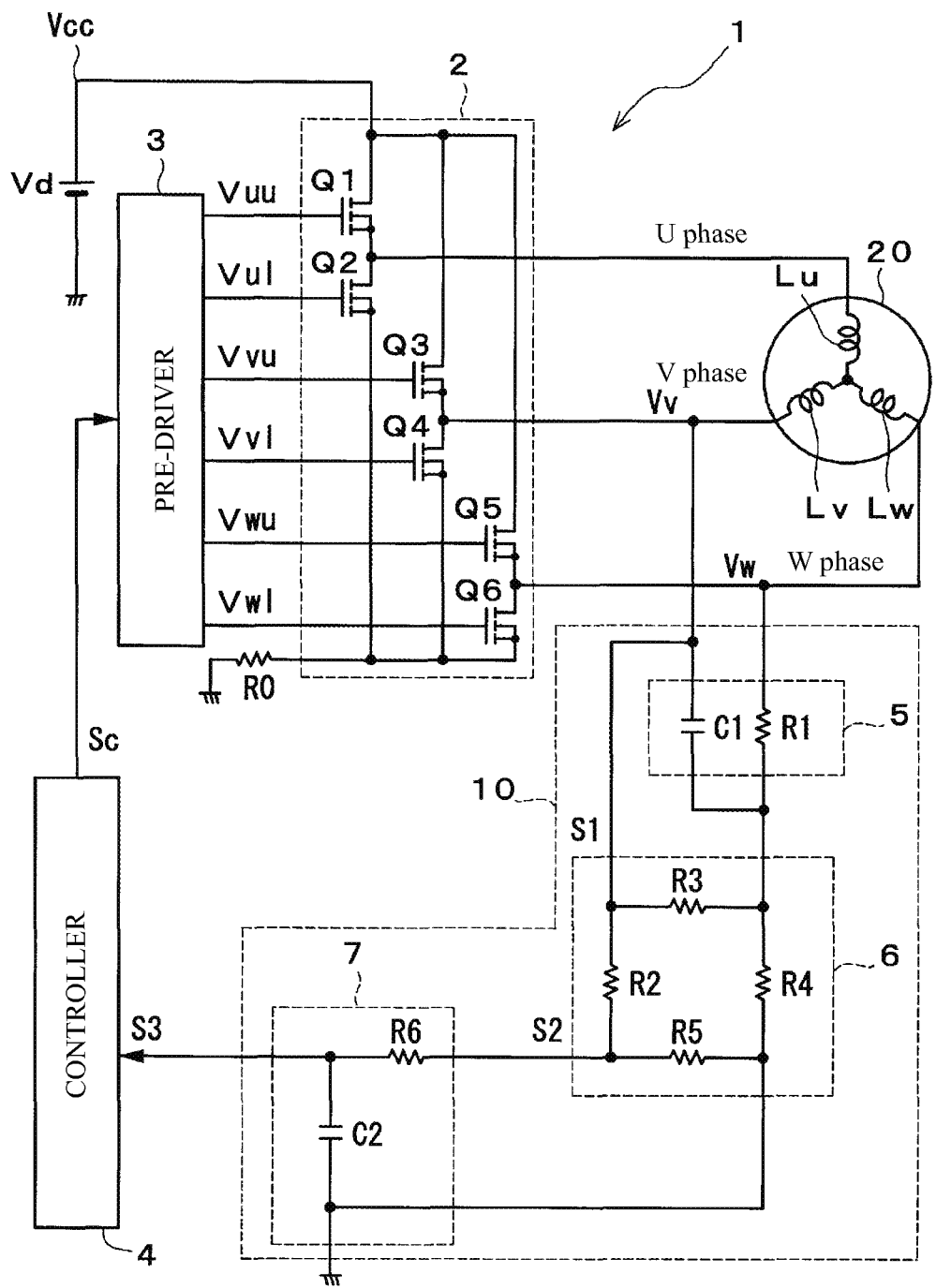
FIG. 1 is a block diagram illustrating a configuration of a motor drive controller according to a first embodiment of the present invention.

FIG. 1 is a block diagram illustrating a configuration of a motor drive controller 1 according to a first embodiment of the present invention.

The motor drive controller 1 includes an inverter circuit 2 (a part of a motor driver), a pre-driver 3 (an example of a motor driver), a controller 4, a phase current detection circuit 10, and a resistor R0. The motor drive controller 1 is connected to a power source Vd and is connected to a motor 20 in three phases of a U-phase wiring, a V-phase wiring, and a W-phase wiring. The motor drive controller 1 controls rotation of the motor 20 and outputs a three-phase AC current to the motor 20.

The inverter circuit 2 has, for example, six field effect transistors (FETs) as switching elements Q1 to Q6. The inverter circuit 2 includes a U-phase switching leg, a V-phase switching leg, and a W-phase switching leg. The inverter circuit 2 is connected to the power source Vd and is also connected to the resistor R0.

The U-phase switching leg includes an upper-arm switching element Q1 and a lower-arm switching element Q2. The drain terminal of the switching element Q1 is connected to the power source Vd. The source terminal of the switching element Q1 from which a U-phase AC signal is output is connected to the drain terminal of the switching element Q2. The source terminal of the switching element Q2 is connected to the power source Vd via the resistor R0. The gate terminal of the switching element Q1 and the gate terminal of the switching element Q2 are connected to the pre-driver 3.

The V-phase switching leg includes an upper-arm switching element Q3 and a lower-arm switching element Q4. The drain terminal of the switching element Q3 is connected to the power source Vd. The source terminal of the switching element Q3 from which a V-phase AC signal is output is connected to the drain terminal of the switching element Q4. The source terminal of the switching element Q4 is connected to the power source Vd via the resistor R0. The gate terminal of the switching element Q3 and the gate terminal of the switching element Q4 are connected to the pre-driver 3.

The W-phase switching leg includes an upper-arm switching element Q5 and a lower-arm switching element Q6. The drain terminal of the switching element Q5 is connected to the power source Vd. The source terminal of the switching element Q5 from which a W-phase AC signal is output is connected to the drain terminal of the switching element Q6. The source terminal of the switching element Q6 is connected to the power source Vd via the resistor R0. The gate terminal of the switching element Q5 and the gate terminal of the switching element Q6 are connected to the pre-driver 3.

In other words, the inverter circuit 2 includes the upper-arm switching elements Q1, Q3, and Q5 which are connected between the phases of armature coils Lu, Lv, and Lw of the motor 20 and one terminal (positive electrode terminal) of the power source Vd, and the lower-arm switching elements Q2, Q4, and Q6 which are connected between the phases of the armature coils Lu, Lv, and Lw and the other terminal (negative electrode terminal) of the power source Vd via the resistor R0.

The inverter circuit 2 is supplied with power from the power source Vd and outputs a three-phase AC current to the U-phase wiring, the V-phase, and the W-phase wiring of the motor 20 when a drive signal is input from the pre-driver 3.

The pre-driver 3 includes, for example, six gate drive circuits. When a control signal Sc is input from the controller 4, the pre-driver 3 generates a drive signal based on the control signal Sc and outputs the generated drive signal to the inverter circuit 2.

In this embodiment, the inverter circuit 2 and the pre-driver 3 constitute a motor driver which is supplied with power from the power source Vd and drives the motor 20 in response to the drive signal.

The resistor R0 is a resistive element for detecting a current flowing in the inverter circuit 2. An end of the resistor R0 is connected to the source terminals of the lower-arm switching elements Q2, Q4, and Q6, and the other end of the resistor R0 is connected to the ground. A voltage is generated at the end of the resistor R0 since the current flowing through the inverter circuit 2 passes from the end to the other end of the resistor R0.

The controller 4 is, for example, a microcomputer, is connected to a phase current detection circuit 10 which will be described below, is supplied with an DC voltage signal S3, and outputs the control signal Sc to the pre-driver 3. The controller 4 performs overcurrent protection based on the DC voltage signal S3 and controls the pre-driver 3 and the inverter circuit 2 constituting the motor driver.

The motor 20 is a three-phase brushless motor used as a fan motor and includes the armature coils Lu, Lv, and Lw. Ends of the armature coils Lu, Lv, and Lw are connected in a Y shape. The other ends of the armature coils Lu, Lv, and Lw are connected to the U phase, the V phase, and the W phase, respectively. The motor 20 is rotationally driven by causing a three-phase AC current is input from the inverter circuit 2 to the U phase, the V phase, and the W phase.

The power source Vd is a constant voltage source supplying a voltage Vcc. For example, the power source Vd stabilizes DC power supplied from a DC power source (not illustrated) as a constant voltage and then supplies the DC power to a motor drive controller 1. The power source Vd is connected to the inverter circuit 2 and is connected to the units of the motor drive controller 1 via wirings (not shown).

The phase current detection circuit 10 includes an RC series circuit 5 (an example of a RC network circuit), an attenuator 6, and a filter circuit 7. The phase current detection circuit 10 is connected to a V-phase node Vv and a W-phase node Vw of the motor 20 to detect phase currents flowing in the armature coils Lv and Lw and to generate a DC voltage signal S3. The phase current detection circuit 10 includes resistors R1 to R6 and capacitors C1 and C2 which are passive elements and thus is inexpensive. In principle, to the phase current detection circuit 10 can detect the phase currents with no loss.

The RC series circuit 5 includes the resistor R1 and the capacitor C1 which are connected in series and outputs a voltage signal S1 across the capacitor C1, which is substantially proportional to the currents flowing in the armature coils Lv and Lw.

That is, the voltage signal S1 corresponds to a variation of the current flowing in the armature coils Lv and Lw. An end of the capacitor C1 is connected to the node Vv and the other end thereof is connected to an end of the resistor R1. The other end of the resistor R1 is connected to the node Vw. Therefore, the RC series circuit 5 is connected in parallel with the armature coils Lv and Lw constituting the phases of the motor 20. The RC series circuit 5 is not limited to the connection between the V-phase and the W-phase and may be preferably connected in parallel with any two-phase correlation of the motor 20.

The attenuator 6 is a resistor network in which the resistors R2 to R5 are connected and outputs a voltage signal S2, which is obtained by attenuating the voltage signal S1, to the filter circuit 7. The resistor R3 is connected in parallel with the capacitor C1 of the RC series circuit 5. The resistor R4 is connected between a connection node of the capacitor C1 and the resistor R1 and the ground. The resistor R2 and the resistor R5 are connected between the node Vv and the ground. The connection node of the resistors R2 and R5 is an output side of the attenuator 6 and outputs the voltage signal S2 obtained by attenuating the voltage signal S1. The attenuator 6 may not be an essential element of the present invention.

The filter circuit 7 is, for example, a low-pass filter including the resistor R6 and the capacitor C2. An end of the resistor R6 is connected to the output side of the attenuator 6 and the other end thereof is connected to an end of the capacitor C2 and the the controller 4. The other end of the capacitor C2 is connected to the ground. As a result, a DC voltage signal S3 which is obtained by smoothing the voltage signal S2 is output to the controller 4, and a time constant of the RC series circuit 5 is set such that the DC voltage signal S3 is substantially proportional to the phase current. Here, a condition in which the DC voltage signal S3 is substantially proportional to the phase current is that the time constant of the RC series circuit 5 is substantially equal to a value which is obtained by dividing inductance values of the coils Lv and Lw by a DC resistance component. When an overcurrent flows as the phase current, the DC voltage signal S3 becomes equal to or greater than a voltage (for example, a reference voltage 3.0 V to be described below) corresponding to a threshold value of the overcurrent and thus can be suitably detected by the controller 4. The controller 4 determines whether an overcurrent flows as the phase current or not based on the DC voltage signal S3, and can perform a overcurrent protection operation.

Even though the time constant of the RC series circuit 5 is not equal to the value which is obtained by dividing the inductance values of the coils Lv and Lw by the DC resistance component, the actual value of the phase current may be estimated from the DC voltage signal S3 by regression analysis in consideration of a difference between the obtained value and the time constant of the RC network circuit. As a result, it is possible to obtain the DC voltage signal S3 corresponding to a variation in the value of the phase current I flowing in the coils Lv and Lw.

Figure 2:
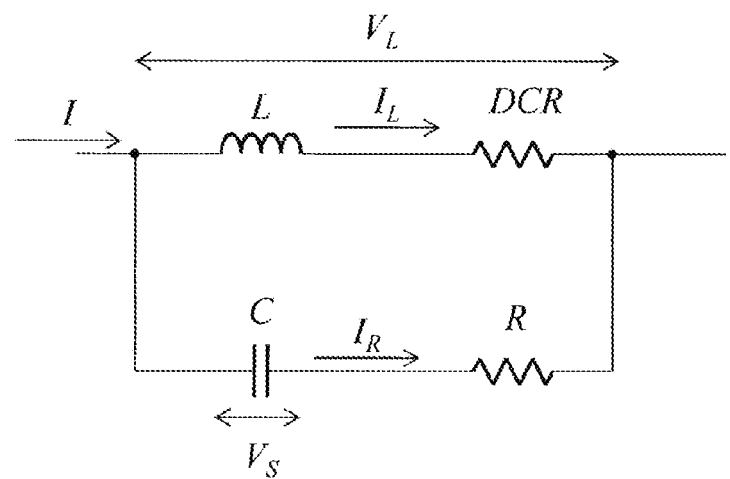
FIG. 2 is an equivalent circuit diagram of a coil and a phase current detection circuit.

FIG. 2 is an equivalent circuit diagram of the armature coils Lv and Lw and the RC series circuit 5. A principle of detecting the phase current will be described below with reference to FIG. 2.

In FIG. 2, a series circuit of the armature coils Lv and Lw of the motor 20 is illustrated as an equivalent circuit including an inductance component L and a DC resistance component DCR.

The RC series circuit 5 in which R and C are connected in series is connected in parallel with the equivalent circuit of the armature coils Lv and Lw. The RC series circuit 5 is illustrated as an equivalent circuit including a DC resistance component R and a capacitance component C. The DC resistance component R represents a resistance value of the resistor R1, and the capacitance component C represents a capacitance value of the capacitor C1.

A current $I_L$ flows in the armature coils Lv and Lw, and a voltage $V_L$ is applied across the armature coils. At this time, a relationship between the current $I_L$ and the voltage $V_L$ is expressed by Equation (1).

$$I_L = \frac{V_L}{j\omega L + DCR} \quad (1)$$

The relationship between the voltage $V_L$ and the current $I_L$ is expressed by Equation (2) that is obtained by modifying Equation (1).

$$V_L = (j\omega L + DCR) I_L \quad (2)$$

A current IR flows in the RC series circuit 5. The current IR is expressed by Equation (3).

$$I_R = \frac{V_L}{R + \frac{1}{j\omega C}} = V_L \cdot \frac{j\omega C}{1 + j\omega CR} \quad (3)$$

As expressed in Equation (4), the sum of the current $I_L$ and the current $I_R$ is the phase current I by Kirchhoff's first law. Compared to the current $I_L$ flowing in the armature coils Lv and Lw of the motor 20, the current $I_R$ is negligibly small and thus the phase current I can be approximated by the current $I_L$.

$$I = I_L + I_R \approx I_L \quad (4)$$

$$\therefore I_L \ll I_R$$

A voltage VS is applied across the capacitance component C. The voltage $V_S$ is expressed by the following approximate equation of Equation (5).

$$V_S = I_R \cdot \frac{1}{j\omega C} \quad (5)$$

$$= \left(V_L \frac{j\omega C}{1 + j\omega CR}\right) \cdot \frac{1}{j\omega C}$$

$$= V_L \cdot \frac{1}{1 + j\omega CR}$$

$$= \frac{j\omega L + DCR}{1 + j\omega CR} \cdot I_L$$

$$\cong \frac{j\omega L + DCR}{1 + j\omega CR} \cdot I$$

$$= \frac{1 + \frac{j\omega L}{DCR}}{1 + j\omega CR} \cdot DCR \cdot I$$

Here, the capacitance component C and the DC resistance component R are adjusted such that the denominator and the numerator of Equation (5) are equal to each other, that is, such that the condition of Equation (6) is satisfied.

$$\frac{L}{DCR} = CR \quad (6)$$

By this adjustment, the denominator and the numerator of Equation (5) are canceled and thus the voltage $V_S$ is equal to the product of the phase current I and the DC resistance component DCR. The condition of Equation (6) is also a condition in which the time constant of the series circuit of the armature coils Lv and Lw becomes equal to the time constant of the RC series network.

By this adjustment, since the phase current I flowing in the armature coils Lv and Lw and the voltage $V_S$ have the same phase, the phase current detection circuit 10 can detect a signal substantially proportional to the phase current I using the voltage $V_S$.

Figure 3:
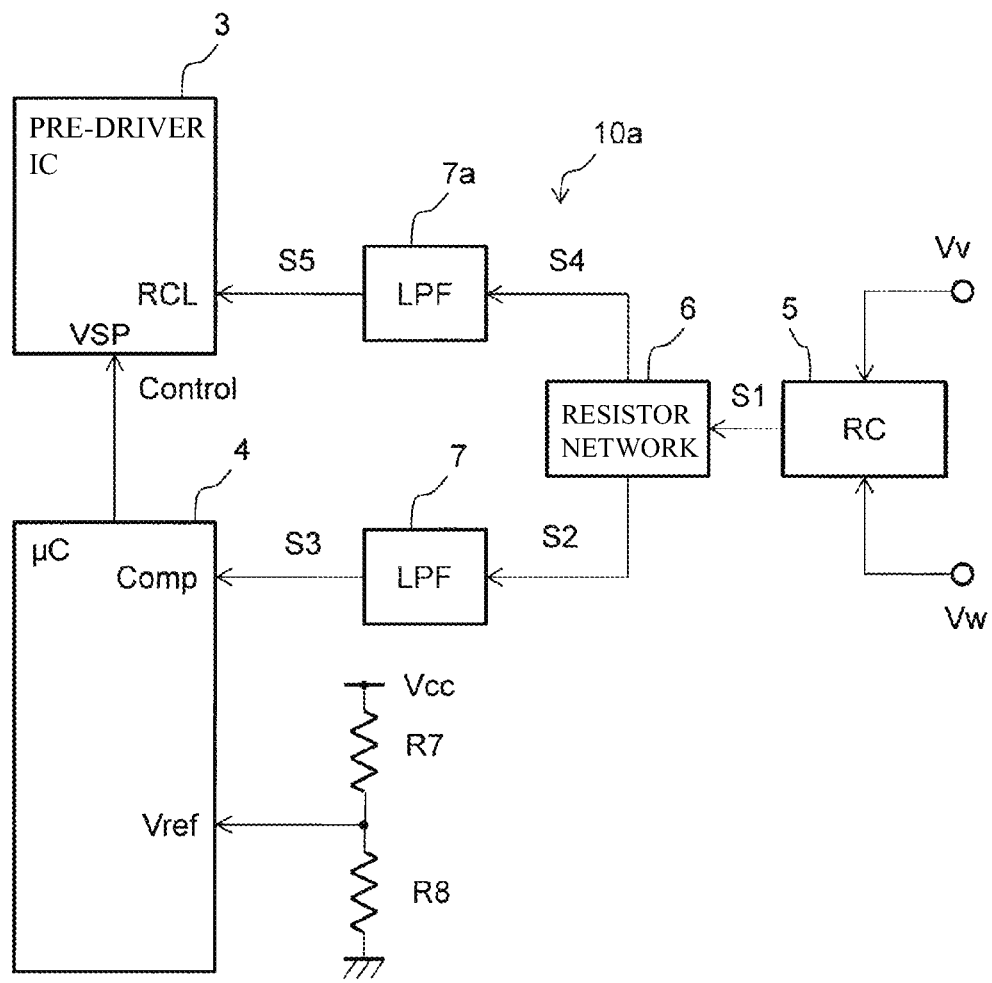
FIG. 3 is a block diagram illustrating a configuration of a lossless overcurrent detection circuit.

FIG. 3 is a block diagram illustrating an example of a configuration of a lossless overcurrent detection circuit 10a. The lossless overcurrent detection circuit 10a is a modified example of the phase current detection circuit 10 illustrated in FIG. 1.

In addition to the same function as the phase current detection circuit 10 illustrated in FIG. 1, the lossless overcurrent detection circuit 10a has a function of outputting an overcurrent detection signal S5 to the pre-driver 3. In addition to the same configuration as the phase current detection circuit 10 illustrated in FIG. 1, the lossless overcurrent detection circuit 10a includes a filter circuit 7a having the same configuration as the filter circuit 7. Here, the filter circuit 7a is a RC integration circuit. In FIG. 3, the filter circuits 7 and 7a are abbreviated to a low pass filter (LPF), the RC series circuit 5 is abbreviated to RC, and the attenuator 6 is abbreviated a "resistor network".

The attenuator 6 is constituted by, for example, the resistor network of FIG. 1 and outputs a voltage signal S2, which is obtained by attenuating the voltage signal S1 by the resistor network, to the filter circuit 7. The filter circuit 7 generates a DC voltage signal S3 by smoothing the voltage signal S2 and outputs the generated DC voltage signal to the Comp terminal (comparison terminal) of the controller 4. A reference voltage based on dividing resistors R7 and R8 is applied to the Vref terminal (reference voltage terminal) of the controller 4. The controller 4 compares the DC voltage signal S3 of the Comp terminal with the reference voltage (for example, 3.0 [V]) of the Vref terminal and performs overcurrent control when the DC voltage signal S3 is greater than the reference voltage. The controller 4 controls the control signal Sc output to a VSP terminal (speed control terminal) of the pre-driver 3 such that the phase current is not greater than a predetermined threshold value. Since the overcurrent detection voltage of the controller 4 is greater than the overcurrent detection voltage of the pre-driver 3, a detection deviation of the controller 4 is smaller than a detection deviation of the pre-driver 3.

The attenuator 6 outputs a voltage signal S4, which is obtained by additionally attenuating the voltage signal S1 by the resistor network (not illustrated), to the filter circuit 7a. The voltage signal S4 is smaller than the voltage signal S2. The filter circuit 7a smooths the voltage signal S4 to generate an overcurrent detection signal S5 that is a DC voltage signal and outputs the generated overcurrent detection signal to an RCL terminal (overcurrent detection terminal) of the pre-driver 3. When the overcurrent detection signal S5 exceeds a predetermined voltage (for example, 0.5 [V]), the pre-driver 3 performs overcurrent control. Since the pre-driver 3 is implemented by an integrated circuit, the pre-driver 3 can perform the overcurrent control more quickly than the controller 4 implemented by a microcomputer.

Figure 4:
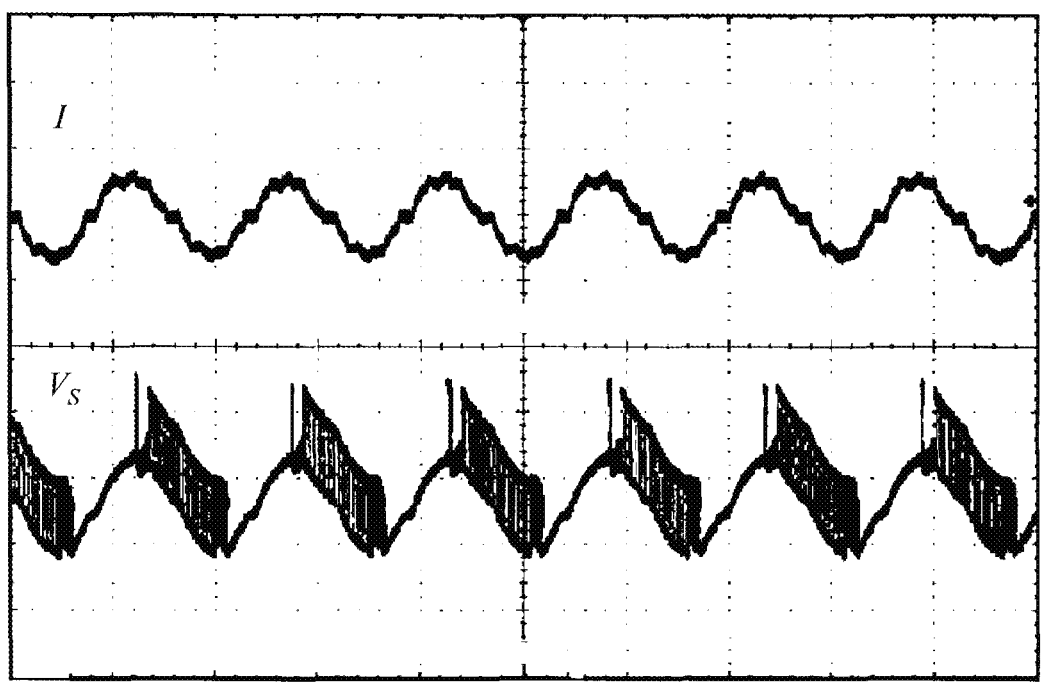
FIG. 4 is a diagram illustrating an example of a waveform of a detected voltage signal.

FIG. 4 is a diagram illustrating a specific example of a waveform of a detected voltage signal.

FIG. 4 illustrates waveforms of the phase current I and the voltage $V_S$ across the capacitor C1 which are measured by an oscilloscope. In this way, it can be seen that the waveform of the voltage $V_S$ is equal to the waveform of the phase current I and the phase current I is detected by the voltage $V_S$. Since the voltage signal S1 is acquired with respect to the ground, a switching waveform of a phase voltage is detected to overlap the waveform of the phase current, but the overcurrent can be correctly detected by smoothing of the filter circuit 7 in the subsequent stage.

Figure 5:
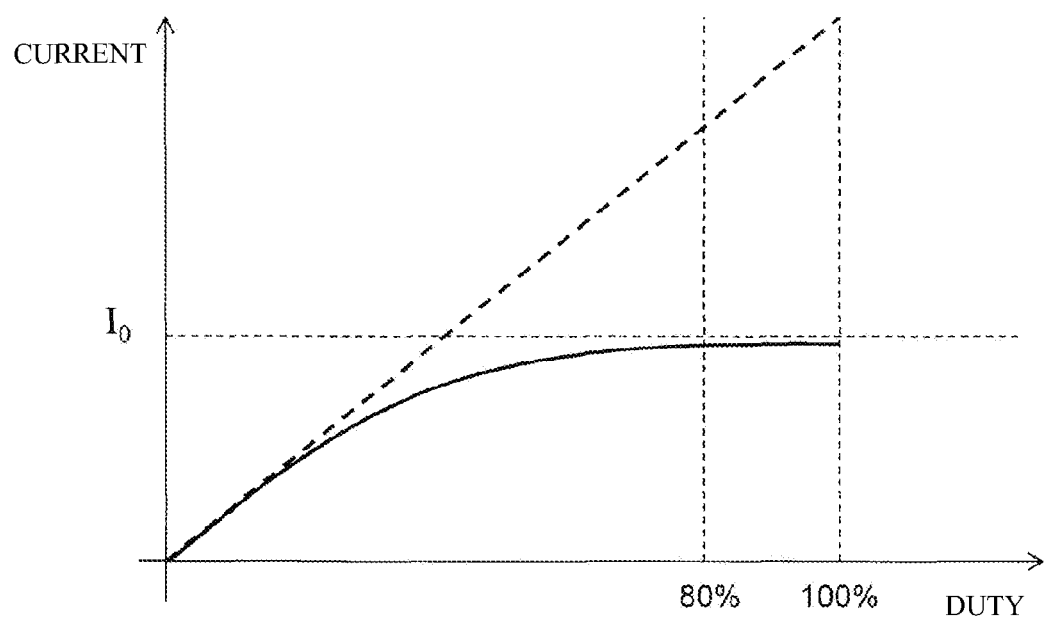
FIG. 5 is a graph illustrating a confirmation result of an overcurrent protection function.

FIG. 5 is a graph illustrating a confirmation result of the overcurrent protection function. The vertical axis of the graph represents a phase current and the horizontal axis thereof represents a duty ratio. The value of the phase current in this embodiment equipped with the overcurrent protection function is indicated by a bold solid line and the value of the phase current of a comparative example not equipped with the overcurrent protection function is indicated by a bold broken line.

As indicated by the bold broken line in FIG. 5, in the comparative example not equipped with the overcurrent protection function, the phase current is substantially proportional to the duty ratio. However, as indicated by the bold solid line, in spite of an increase in the duty ratio, the phase current does not exceed a predetermined value $I_0$ in this embodiment equipped with the overcurrent protection function. For example, the phase current effective values at a duty ratio of 80% and 100% have almost the same level. Accordingly, it can also be confirmed that the phase current is correctly detected and controlled.

Figure 6:
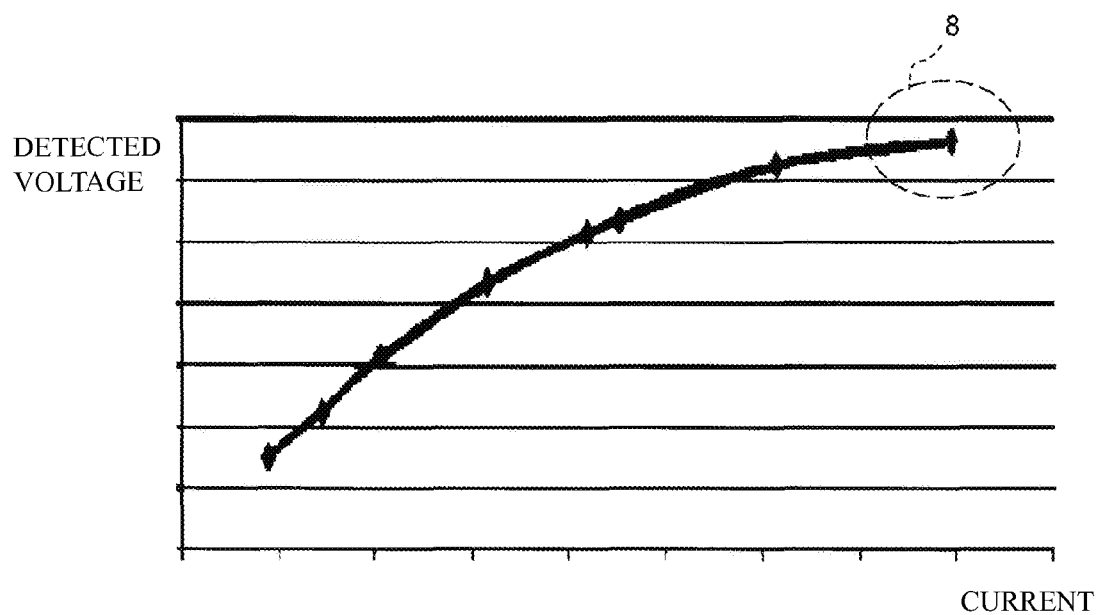
FIG. 6 is a graph illustrating a relationship between a current and a detected voltage.

FIG. 6 is a graph illustrating a relationship between a current and a detected voltage.

In setting the time constant of the RC network circuit, it is preferable that the relationship between the current and the detected voltage have some regularity. Therefore, characteristics illustrated in the drawing are finally obtained by attempting to combine various constants. Here, when the DUTY is changed, an input voltage and output detected voltage are measured and are plotted in a graph and a line obtained by approximating the plot with a polynomial is drawn in the graph.

An area 8 is a target area of the overcurrent protection. When a voltage corresponding to the area 8 is detected, the controller 4 performs the overcurrent protection operation.

According to the phase current detection circuit 10 of the first embodiment, since steady loss does not occur in principle, the motor drive controller 1 can be driven with low power consumption. Since the motor drive controller 1 includes passive components such as a resistor and a capacitor, it is possible to decrease the number of components in comparison with the method using a shunt resistor, thereby achieving a decrease in size and a decrease in cost. In comparison with a method using a combination of the shunt resistor and a level shift circuit, it is possible to improve detection accuracy and to reduce a variation of the overcurrent detection threshold value.

Figure 7:
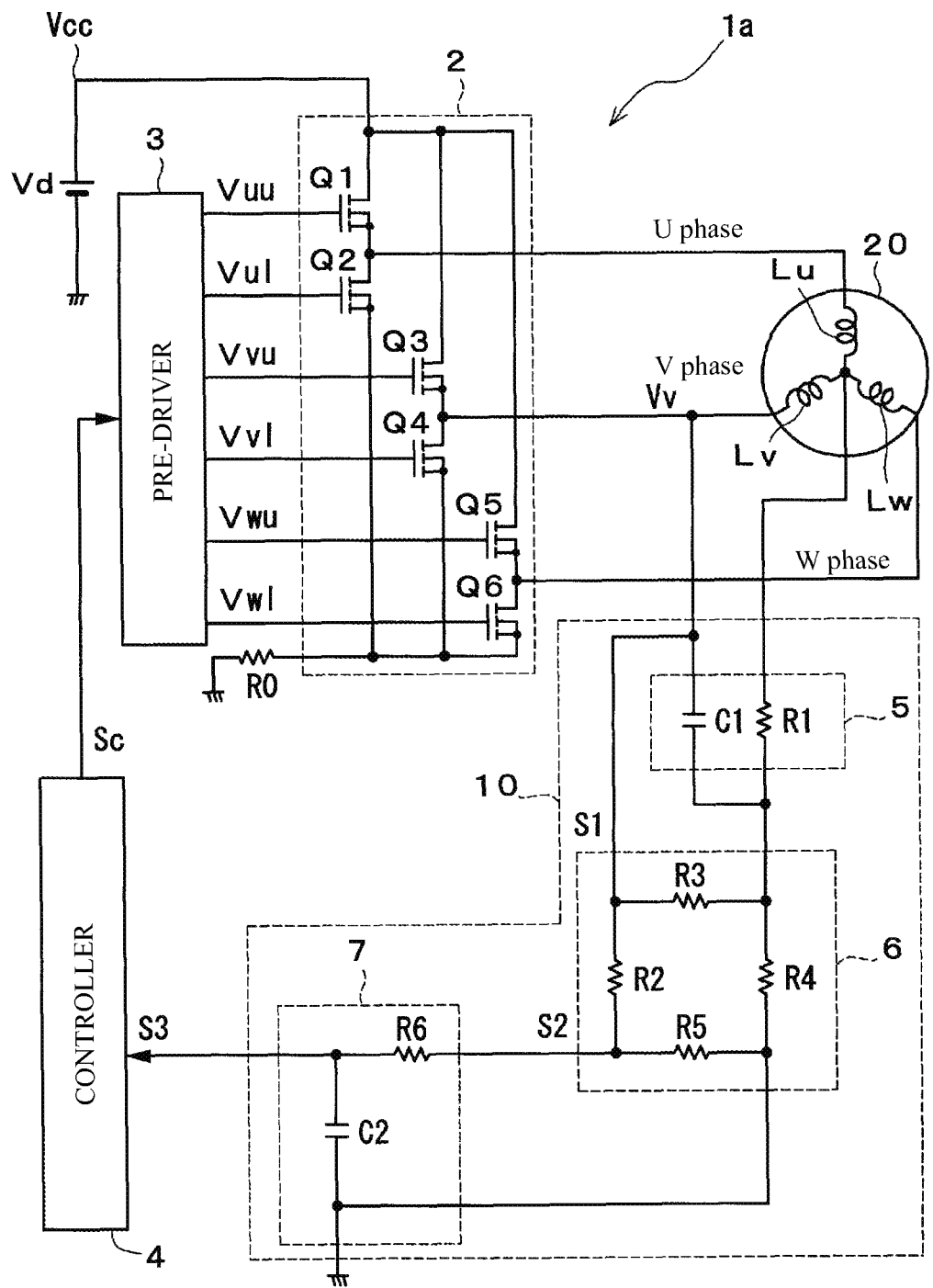
FIG. 7 is a block diagram illustrating a configuration of a motor drive controller according to a second embodiment of the present invention.

FIG. 7 is a block diagram illustrating a configuration of a motor drive controller 1a according to a second embodiment of the present invention. The same elements as in the motor drive controller 1 according to the first embodiment illustrated in FIG. 1 are referenced by the same reference numerals.

The phase current detection circuit 10 is connected to a midpoint of the armature coils Lu, Lv, and Lw, and the V phase of the motor 20. Even by this connection, it is possible to detect the phase current in the same manner as in the motor drive controller 1 according to the first embodiment. The phase current detection device 10 may be connected to the midpoint of the armature coils Lu, Lv, and Lw, and any one phase of the motor 20.

Modified Example

The present invention is not limited to the above-mentioned embodiments, but can be modified in various forms without departing from the gist of the present invention. For example, the following modified examples (a) to (g) can be considered.

(a) The configurations of the circuits constituting the phase current detection circuit 10 are not limited to the above-mentioned embodiments. For example, the attenuator 6 is not limited to the resistor network. The filter circuit 7 is not limited to the RC filter.

(b) The attenuator 6 is not an essential element of the present invention.

(c) Phases connected to the phase current detection device 10 are not limited to the above-mentioned embodiments. For example, the U phase and the W phase or the U phase and the V phase may be connected thereto.

(d) The phase current detected by the phase current detection device 10 is not limited to one phase of the motor 20, but may be plural phases. (e) A feedback destination of the DC voltage signal generated by the phase current detection circuit 10 may be any one of the controller 4 and the pre-driver 3 or may be both of the controller 4 and the pre-driver 3.

(f) In the above-mentioned embodiments, the motor is described as a three-phase brushless motor, but the type of the motor and the number of phase are not limited in particular.

(g) The DC voltage signal may be ideally proportional to the phase current, but is not limited thereto as long as both have a correlation. Here, the correlation is not limited to linearity but may be a relationship of a non-linear correlation curve.

As described with reference to the embodiments, according to the present invention, it is possible to provide a motor drive controller that can detect a current detection with very low power consumption with a simple circuit configuration.

What is claimed is:
1. A motor drive controller comprising:
  a phase current detection circuit including:
    an RC network circuit in which a resistor and a capacitor are connected in series, the RC network circuit being configured to be connected in parallel with one or more coils of each phase of a motor; and a filter circuit that smooths a signal based on a voltage signal across the capacitor, wherein the phase current detection circuit generates a DC voltage signal that corresponds to a change in a value of a phase current flowing in the coils;

a motor driver that drives the motor by applying a voltage to each phase of the motor; and a controller that receives the DC voltage signal from the phase current detection circuit and controls the motor driver based on the DC voltage signal.

2. The motor drive controller according to claim 1, wherein the phase current detection circuit further includes an attenuator that outputs a voltage signal, which is obtained by attenuating the voltage signal across the capacitor, to the filter circuit.

3. The motor drive controller according to claim 1, wherein the motor is a three-phase brushless motor having Y-connected wirings, and wherein the RC network circuit is connected in parallel with arbitrary two of the three phases of the motor.

4. The motor drive controller according to claim 1, wherein the motor is a three-phase brushless motor having Y-connected wirings, and wherein the RC network circuit is connected in parallel between a midpoint of the Y-connected wirings and one of the three phases of the motor.

5. The motor drive controller according to claim 1, wherein the DC voltage signal sets a time constant of the RC network circuit so as to correspond to the change in a value of the phase current flowing in the coils.

6. The motor drive controller according to claim 1, wherein a time constant of the RC network circuit is set based on a value which is obtained by dividing an inductance value of the one or more coils of each phase of the motor by a DC resistance component.

7. The motor drive controller according to claim 1, wherein the controller operates to perform a overcurrent protection based on the DC voltage signal generated by the phase current detection circuit.

\* \* \* \* \*